United States Patent [19]

Kling

[11] Patent Number: 4,791,563
[45] Date of Patent: Dec. 13, 1988

[54] ARRANGEMENT FOR APPORTIONING PRIORITY AMONG CO-OPERATING COMPUTERS

[75] Inventor: Lars-örjan Kling, Södertälje, Sweden

[73] Assignee: Telefonaktiebolaget LM Ericsson, Stockholm, Sweden

[21] Appl. No.: 882,933

[22] PCT Filed: Nov. 1, 1985

[86] PCT No.: PCT/SE85/00429
§ 371 Date: Jun. 27, 1986
§ 102(e) Date: Jun. 27, 1986

[87] PCT Pub. No.: WO86/03606
PCT Pub. Date: Jun. 19, 1986

[30] Foreign Application Priority Data

Dec. 12, 1984 [SE] Sweden ............... 8406312-2

[51] Int. Cl.⁴ .............................. G06F 13/18
[52] U.S. Cl. ..................... 364/200; 340/825.51
[58] Field of Search ... 364/200 MS File, 900 MS File; 340/825.5, 825.51; 370/89, 95

[56] References Cited

U.S. PATENT DOCUMENTS

| | | | |
|---|---|---|---|
| 4,096,569 | 6/1978 | Barlow | 364/200 |
| 4,121,285 | 10/1978 | Chen | 364/200 |
| 4,151,592 | 4/1979 | Suzuki et al. | 364/200 |
| 4,257,095 | 3/1981 | Nadir | 364/200 |
| 4,271,467 | 6/1981 | Holtey | 364/200 |
| 4,302,808 | 11/1981 | Zanchi et al. | 364/200 |

OTHER PUBLICATIONS

Soe Hojberg, K., "One-Step Programmable Arbiters for Multiprocessors", Computer Design, Apr. 1978, pp. 154–158.

*Primary Examiner*—Eddie P. Chan
*Assistant Examiner*—Jonathan C. Fairbanks
*Attorney, Agent, or Firm*—Roberts, Spiecens & Cohen

[57] ABSTRACT

A priority apportioning arrangement for computers with processors of two types, namely a first high-priority type which can determine its priority itself in relation to processors of a second low-priority type when using a common bus. The arrangement contains a first logic circuit (20) which has its first input activated on a request for access from one of the low-priority units (3a–3h), its second input activated on a request for access from the high-priority unit (1) and its third activated during the whole time the bus is used and has two outputs for assigning the bus a low-priority unit or the high-priority unit. The arrangement furthermore contains a second logic circuit (40) with two inputs, of which one senses that the high-priority unit desires access and the other senses that this access can take place with delay, the circuit also having two outputs, of which one is for indicating to the first logic circuit that the access request from the high-priority unit is present, and the other for indicating that the bus is occupied. When the input signal to the second logic circuit indicates that granting the bus to the high-priority unit can take place with delay, the arrangement has time to grant the bus to a low-priority unit, but the high-priority unit still has immediate access to the bus after termination of the task of the low-priority unit.

5 Claims, 2 Drawing Sheets

ARRANGEMENT FOR APPORTIONING PRIORITY AMONG CO-OPERATING COMPUTERS

FIELD OF INVENTION

The invention relates to a priority apportioning arrangement for computers containing processors of two types, namely a first high-priority type which can determine its priority itself in relation to processors of a second low-priority type when using a common bus, the arrangement being such as to allow the use of the bus by the low-priority type if the high-priority processor does not have important tasks.

BACKGROUND

In a system having several processors using the same bus where none of the processors has priority, distribution on the bus can take place with the aid of logic which obtains a signal from each of the prospective users and assigns the bus to them in a given order, with the latest user coming last. None of the processors can be kept out longer than for a number of accesses corresponding to the number of processors minus one.

Apportioning becomes more complicated when a number of processors with low priority and a processor with high priority work on the same bus. In known arrangements such as that described in Electronic Design, May 24th, 1978, extra time is necessary for assigning the bus when the high-priority processor needs it.

SUMMARY OF INVENTION

An object of the invention is to shorten the waiting time and to give a high-priority processor full priority when it needs the bus, but to give access to associated low-priority processors when the bus is not needed by the high-priority processor.

This is achieved in accordance with the invention by blocking access to the bus for the low-priority units when the high-priority one needs the bus, whereas when the high-priority unit does not need the bus immediately, the low-priority units are given access for a time in given proportion to the operating time of the high-priority unit.

In accordance with the invention there is provided a computer system which comprises a bus, a memory coupled to the bus, a plurality of processors, including high-priority processors and low-priority processors and access circuits for selectively coupling the high and low-priority processors via the bus to the memory according to a priority arrangement. The low-priority processors are capable of selectively generating responsive request-for-bus-access signals. Further includes in a program selector arrangement capable of generating a first signal which ultimately results in a reverse bus signal for coupling the high-priority means via the bus to the memory and a second signal allowing access to the low priority processors. The processors are further capable of generating bus-occupied signals.

The access circuit includes first and second logic circuits. The first logic circuit includes first, second and third inputs for respectively receiving request-for-bus-access signals from the low-priority processors, a second input signal and a bus-occupied signal. The first logic circuit furthermore includes first and second outputs for transmitting access-to-low-priority-processors signals and access-to-high-priority-processors signals. The second logic circuit includes first and second inputs for receiving the first and second signals respectively from the program selector arrangement and it further includes a third input coupled to the second output of the first logic circuit. The second logic circuit generates the reserve-bus signal and one of the bus-occupied signals and further includes first and second outputs for respectively transmitting the latter said signals to the second and third inputs of the first logic circuit. The first output of the first logic circuit is coupled to the low-priority-processors for accessing the latter respectively via the bus to the memory. The second output of the first logic circuit is coupled to the high-priority-processors to couple the same via the bus to the memory.

Other objects, features and advantages of the invention will be found in the Detailed Description which follows hereinbelow.

BRIEF DESCRIPTION OF DRAWINGS

The invention will be described below with reference to the accompanying drawings, in which.

DETAILED DESCRIPTION

Figure 1:
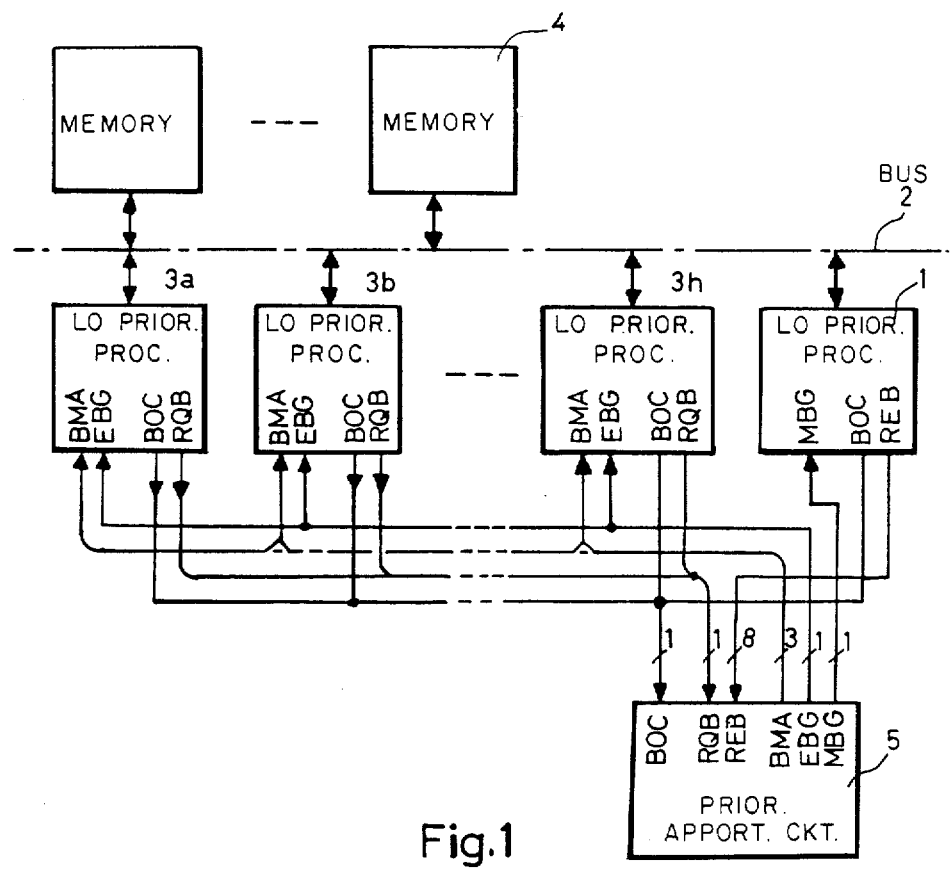
FIG. 1 is a block diagram of a processor system with processors working through a common bus.

According to FIG. 1, a processor 1 with high priority is connected via a bus 2 to a plurality, in all eight, of low-priority processors $3a$–$3h$. A memory 4 is connected to the bus, and the processors have access to the memory via the bus. The problem occurring in this co-operation is that access for the high-priority processor must always be insured, while the low-priority processors share the remaining access time. In accordance with the invention, this is solved by the priority apportioning arrangement 5. The arrangement is indicated as a separate unit, but may be divided such that certain parts are in the various processors. The signals with which these units communicate with each other will be explained in detail in connection with FIG. 2. Their designations are as follows:

BMA = bus master address. Selects one of the 8 low-priority processors.

EBG = external bus grant. Grants access to one of the low-priority units.

MBG = intensive processor bus grant. Grants access to the high-priority processor.

RQB = request bus. Request for bus access from the low-priority units.

REB = reserve bus. Request for access to the bus from the high-priority processor.

BOC = bus occupied. The bus is engaged, work is in progress.

Figure 2:
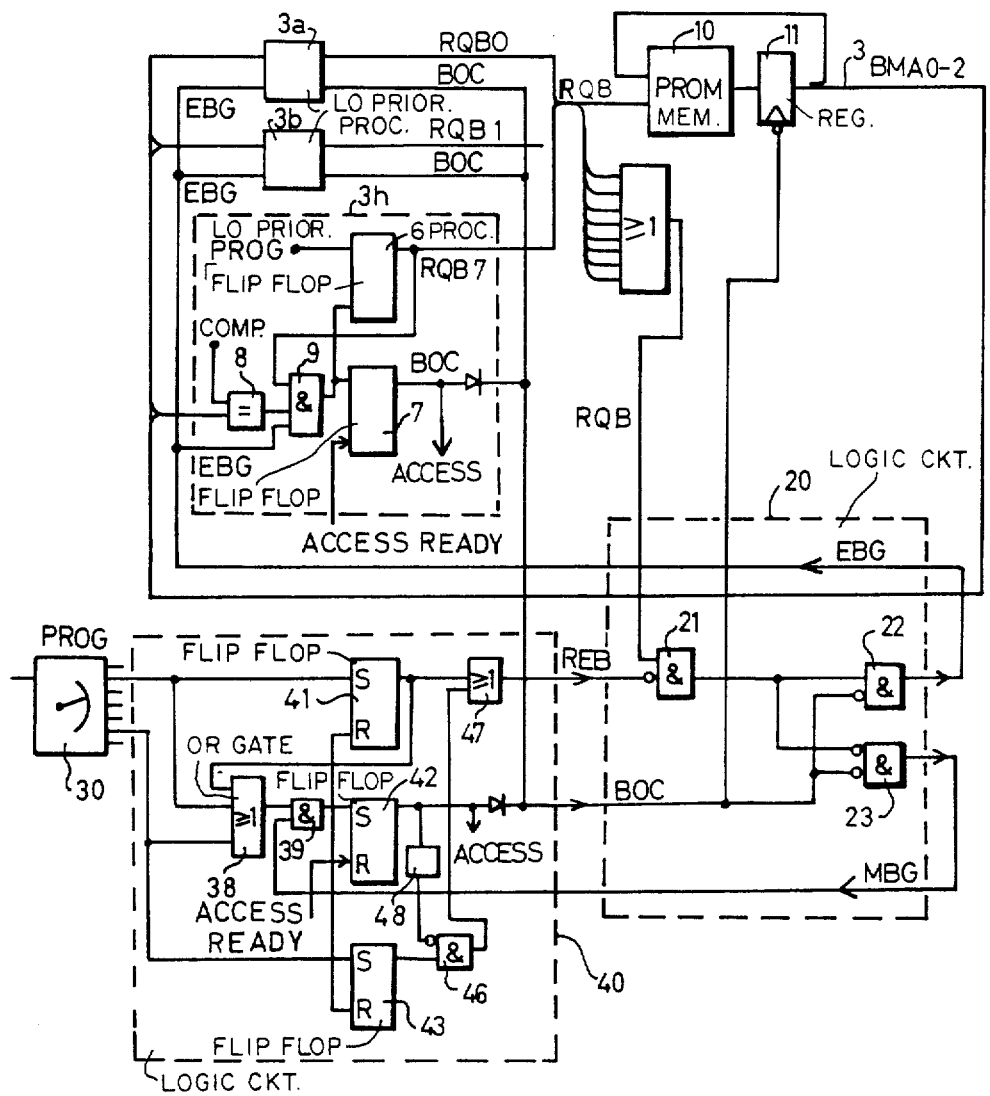
FIG. 2 is a block diagram of a priority distribution arrangement in accordance with the invention.

FIG. 2 illustrates the priority apportioning arrangement in the form of a block diagram. The mutual apportioning of the bus between the low-priority processors takes place with the aid of a logic consisting of a PROM memory 10 and a register 11. Each low-priority processor $3a$–$3h$, in all eight according to the exemplified embodiment, sends a signal RQB with a request for access to the PROM memory 10, which contains a table. In the table, there is given the address of the low-priority processors which should be activated next.

The address is pointed out by a signal BMA which enables addressing eight different units via a 3-wire line. the fed-out address is registered in the register 11 and points out in the memory a new address which is to be used when the next low-priority processor sends an RQB signal. Of the low-priority units, only the unit 3h is indicated in detail. A wail flip-flop 6 has its output activated when bus access is desired according to the program, and an access flip-flop is denoted at 7, this flip-flop being activated when the processor has obtained access flip-flop is kept activated as long as the associated processor uses the bus. During this time, the flip-flop sends the signal BOC denoting that the bus is engaged by the processor. The flip-flop 7 is activated by a comparator 8 determining that the address BMA sent from the register 11 agrees with the address of the processor itself and activates an input on an AND circuit 9, which obtains an EBG signal on another input, denoting that the bus is available for the low-priority processors. Such an arrangement is already known.

If it is desired to subdivide the access between the low-priority processors and the high-priority processor such that the former will have access to the bus during a time which is in a given proportion to the time during which the high-priority processor uses the bus, although permitting the high-priority processor to have immediate access to the bus at any time, an arrangement in accordance with the invention is necessary. The arrangement includes a first logic circuit 20 controlling the assignment of the bus alternatively to the high-priority unit or to a low-priority unit, and a second logic circuit 40, the output signal of which indicates that the high-priority unit is in immediate need of the bus or that it can temporarily release the bus to a low-priority unit. According to the illustrated embodiment the first logic circuit 20 is arranged outside the processors while the second logic circuit 40 is in the high-priority processor. However, where the logic circuits are situated has no importance from the inventive aspect.

The first logic circuit 20 has three inputs, a first where a signal RQB occurs when one of the low-priority units needs the bus, a second where a signal REB occurs when the high-priority unit needs the bus and a third where a signal BOC occurs denoting that the bus is engaged by one of the units. The signals on the first and the second inputs are transmitted to an AND circuit 21 which sends an output signal only if the high-priority unit does not request access, and is blocked for the opposite case. This signal is fed to an input of an AND circuit 22 the negation input of which obtains the signal BOC. When the signal BOC thus ceases in connection with the bus being disengaged and the signal REB does not occur since the high-priority unit is not in immediate need of the bus, an EBG signal is sent to enable access for one of the low-priority units. A further AND circuit 23 is arranged, which obtains the AND circuit 21 output signal on one side and the BOC signal on the other side. If both these signals cease, the signal MBG is generated, which assigns the bus to the high-priority unit and this signal is fed to the second logic circuit 40.

A program selector 30 provides one of the two alternative signals in response to the program in progress. The first type of signal from the program selector signifies that immediate bus access is desired by the high-priority unit, and the other signal signifies that immediate access is desired, but low-priority units are also permitted to use the bus. A wait flip-flop 41 has its output activated immediately when the first type of signal is fed to its activating input S. The output signal blocks the circuit 21 so that access to the bus from the low-priority units is prevented. When the (bus occupied) signal BOC ceases, the bus is once again assigned to the high-priority unit by the signal MGB. This is fed to one input of an AND circuit 39, the other input of which obtains the program selector signal via an OR circuit 38. The output signal of the AND circuit 39 activates an access flip-flop 42, which feeds a BOC signal via its output to the logic circuit 20 to indicate that the bus is occupied. If the first type of signal remains from the program selector, the output of the wait flip-flop 41 is immediately activated so that the circuit 21 is kept blocked and no EBG signal is sent for giving access to the low-priority units. The other type of signal from the program selector 30 signifies that the high-priority unit can allow access for a low-priority unit. A flip-flop 43, which is activated by this signal, feeds a signal to the input of and AND circuit 46 in which a negation input is connected to the output of the flip-flop 42 so that it is blocked the whole time the high-priority processor uses the bus. The output of the AND circuit 46 is connected to an input of the OR circuit 47 which will send the output signal of the circuit 46 to the AND circuit 21. By activating the output signal of the circuit 46, and the generation of the REB signal taking place with a given delay after the BOC signal has ceased, due to the delay circuit 48, the REB signal does not occur until after the EBG signal has occurred at the output of the circuit 22, so that one of the low-priority units will be given access. The REB signal occurs immediately afterwards which insures that the high-priority unit is given direct access when the "bus occupied" signal BOC has ceased.

Figure 3:
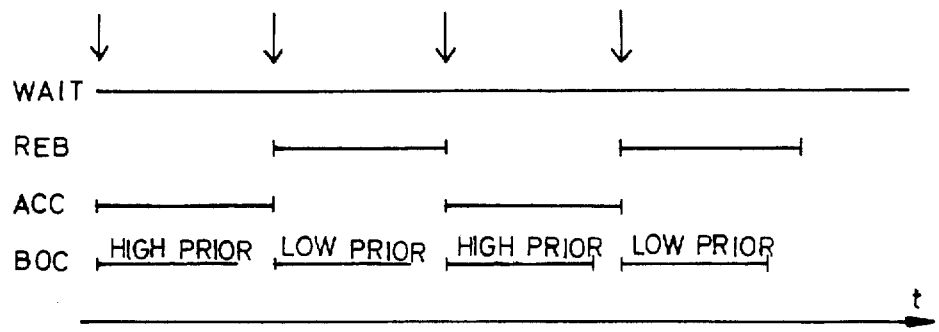
FIG. 3 is a time chart illustrating how the bus is assigned when the high-priority processor does not need the bus immediately.

This is further explained in the time chart according to FIG. 3. When the high-priority unit is working and there is no immediate need to use the bus again, there is no standing REB signal from the flip-flop 41. When the "bus occupied" signal BOC ceases, the output of the circuit 46 is activated with a time lag such that the REB signal does not occur until the EBG signal has had time to be sent to the low-priority processors. Immediately afterwards the circuit 21 is once again blocked by the REB signal so that, when the low-priority unit has completed its task and the BOC signal has ceased, the high-priority unit can take over the bus without delay. By the BOC signal's ceasing, the register 11 is activated and the identity of the low-priority unit can be sent out. With the aid of the desribed arrangement, it will be possible to assign the bus to the low-priority units during such periods where the program does not make necessary immediate access for the high-priority unit, although it is ensured that the high-priority unit always has immediate access to the bus when so required.

What is claimed is:

1. Apparatus for apportioning priority in a computer including a common bus and processors of two types including a first high-priority type which can determine its priority in relation to processors of a second low-priority type for assigning connection to said common bus, said apparatus allowing the low-priority type to use the bus if the high-priority processor does not require priority, said apparatus comprising first and second logic circuit means, the first logic circuit means (20) having three inputs including a first input for receiving an input signal (RQB) which signifies a request for access from one of the low-priority processors (3a-3h), a second input for receiving an input signal (REB) which signifies a request for access from the high-priority processor (1) and a third input for receiving an input signal (BOC) which occurs during the entire time that the bus is used, the first logic circuit means (20) having first and second outputs, a signal (EBG) occurring on the first output for assigning the bus a low-priority processor (3a-3h) if only the first input has been activated, a signal (MGB) occurring on the second output for assigning to the bus the high-priority processor while the signal on the first output is inhibited, the second logic circuit means (40) having first and second outputs and first and second inputs, said first output of said second logic circuit means feeding a signal (REB) constituting a request for access from the high-priority processor to the second input of the first logic circuit means, said second output of said second logic circuit means feeding a signal (BOC), indicating that the bus is occupied, to the third input of the first logic circuit means, a signal (REB) occurring on the first output of said second logic circuit means on its activation and denoting at the second input of the first logic circuit means that the high-priority processor desires access, an assigning signal (MBG) then occurring on the second output of the first logic circuit means, the second input of the second logic circuit means on activation receiving a signal for generating a request for access signal for the high-priority processor with delay on the first output of the second logic circuit means so that the signal (EBG) for assigning the bus to a low-priority processor has time to occur, the high-priority processor still having immediate access to the bus after termination of operation of the previously connected low-priority processor.

2. A computer system comprising a bus, memory means coupled to said bus, a plurality of processors including a high-priority means and a plurality of low-priority means, access means for selectively coupling said priority means via said bus to said memory means according to a priority arrangement, said low priority means selectively generating respective request-for-bus-access signals, and program selector means generating a first signal adapted for resulting in a reserve-bus signal for coupling said high priority means via said bus to said memory means and a second signal allowing access to said low-priority means, said processors being adapted to generate bus-occupied signals, said access means including first and second logic circuit means, said first logic circuit circuit means including first, second and third inputs for respectively receiving request-for-bus-access signals from the low priority means, a second input signal, and a bus-occupied signal and first and second outputs for transmitting access-to-low-priority-means signals and access-to-high-priority-means signals, said second logic circuit means including first and second inputs for receiving the first and second signals respectively from the program selector means and further including a third input coupled to the second output of the first logic circuit means, said second logic circuit means generating said reserve-bus signal and one of said bus-occupied signals and including first and second outputs for respectively transmitting the latter said signals to the second and third inputs of the first logic circuit means, the first output of the first logic circuit means being coupled to the low-priority means for accessing the latter respectively via the bus to the memory means, the second output of the first logic circuit means being coupled to the high-priority means to couple the same via the bus to said memory means.

3. Apparatus as claimed in claim 2 wherein said first and second logic circuit means include means to inhibit generation of a signal at the first output means to inhibit the coupling of low-priority means via the bus to said memory means.

4. Apparatus as claimed in claim 3 wherein said second logic circuit means comprises further means responsive to the second signal of the program selector means to generate a signal to prevent the inhibiting of the coupling of the low-priority means.

5. Apparatus as claimed in claim 4 wherein said further means includes delay means to enable one of said low-priority means to be coupled to said bus before the high-priority means is coupled to the bus when the program selector means is generating the second signal thereof.

* * * * *